No. 700,096. Patented May 13, 1902.
W. B. SKOTNICKI & A. F. OSTROWSKI.
AUTOMATIC SLUICE.
(Application filed Oct. 7, 1901.)
(No Model.) 8 Sheets—Sheet 3.
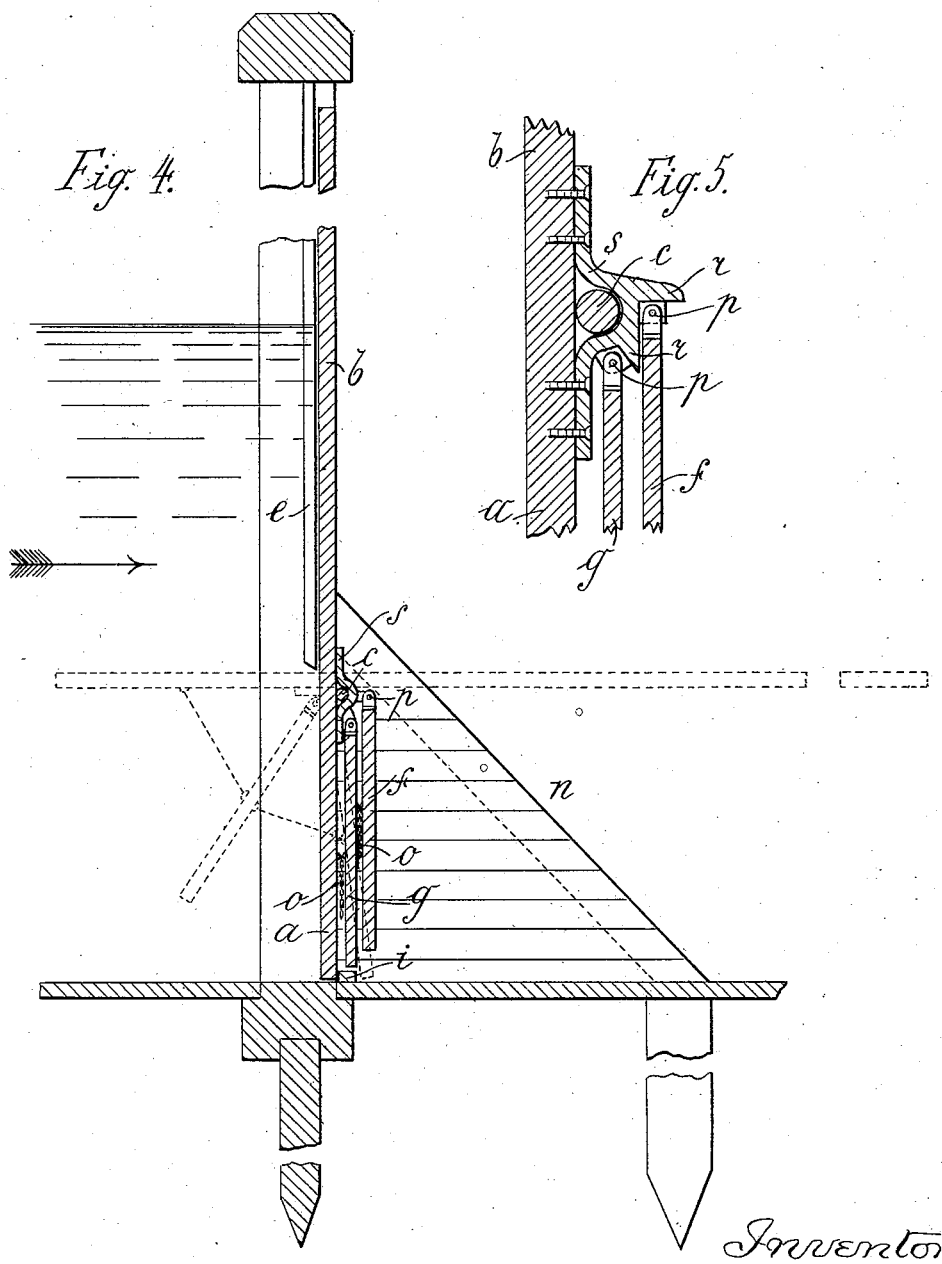

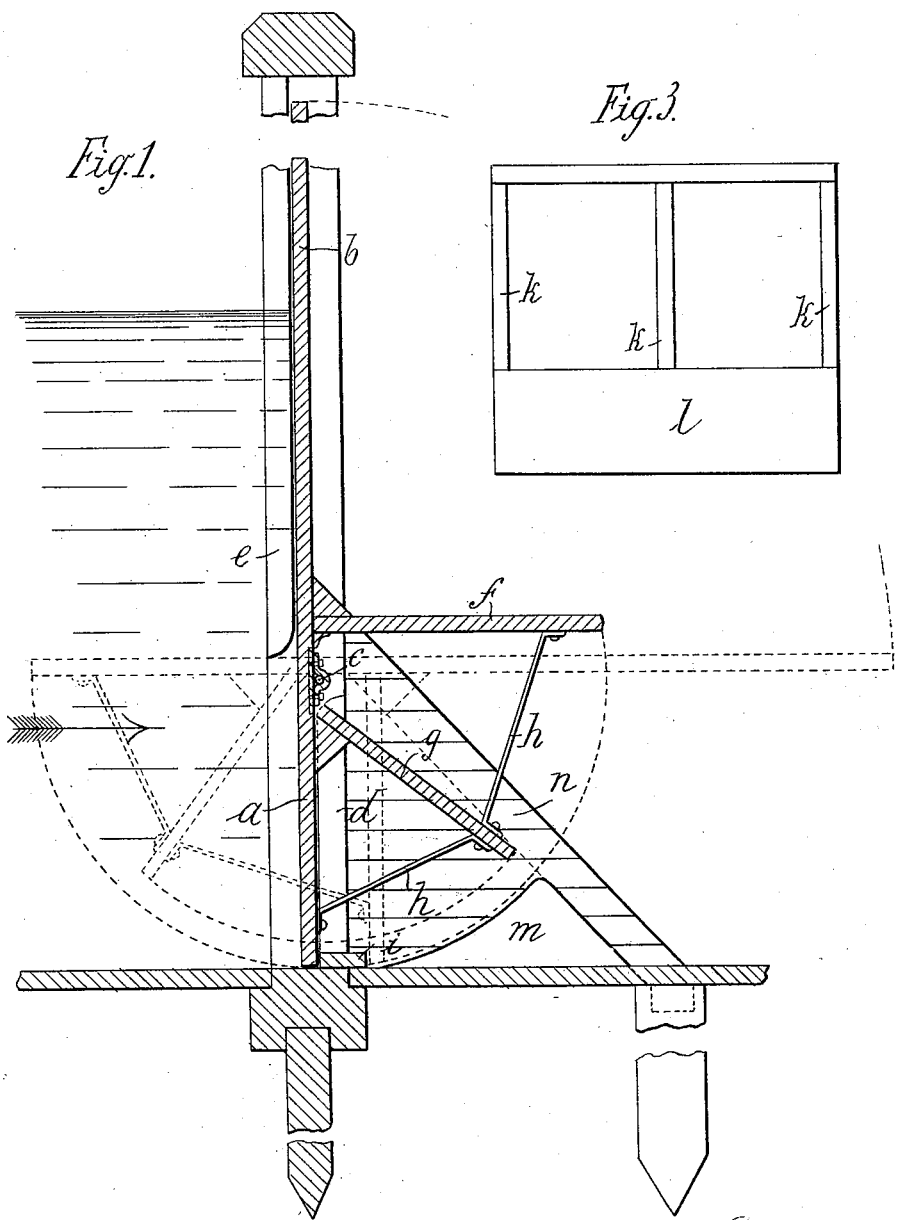

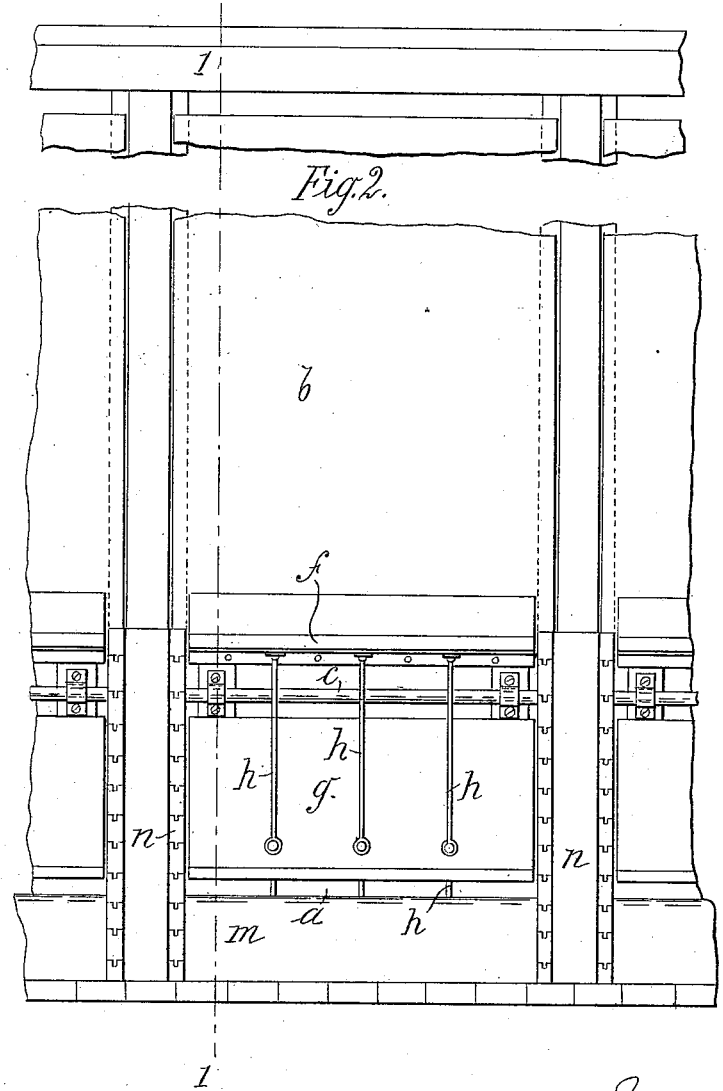

No. 700,096. Patented May 13, 1902.
W. B. SKOTNICKI & A. F. OSTROWSKI.
AUTOMATIC SLUICE.
(Application filed Oct. 7, 1901.)
(No Model.) 8 Sheets—Sheet 4.
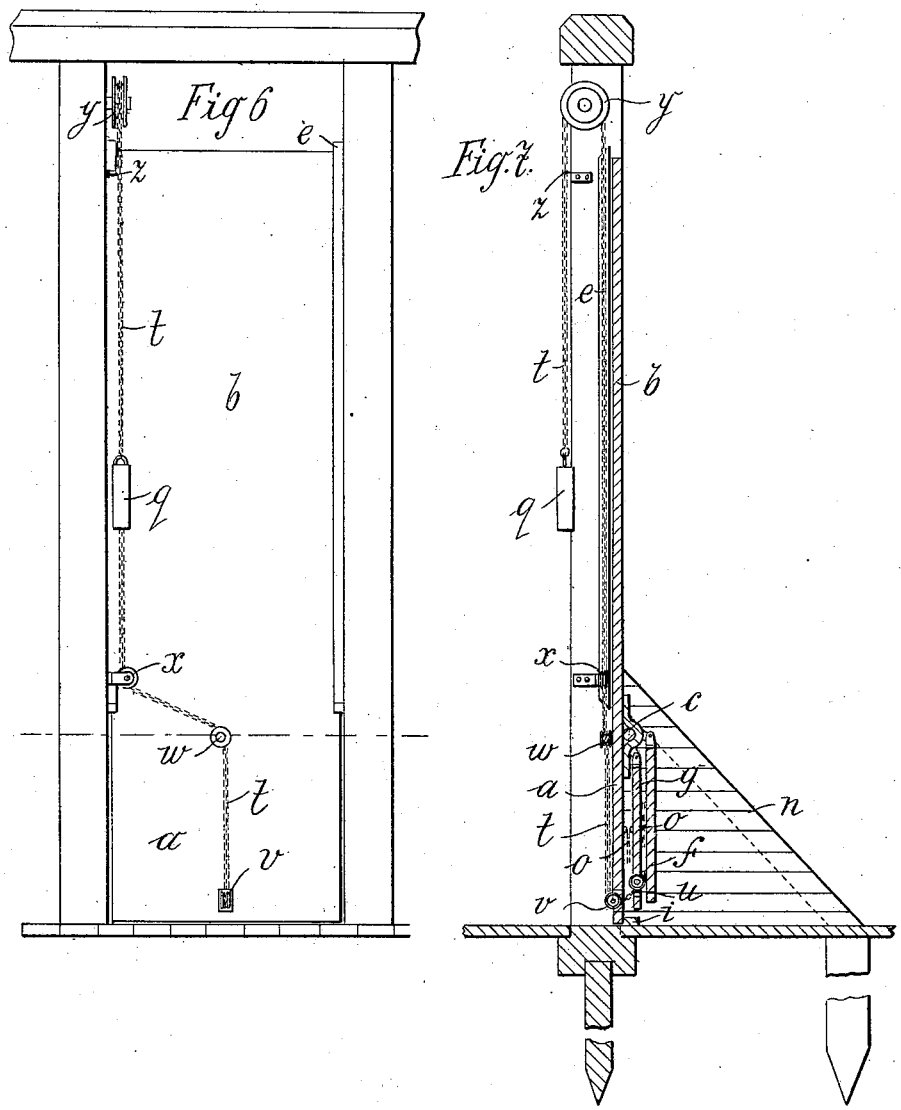

No. 700,096. Patented May 13, 1902.
W. B. SKOTNICKI & A. F. OSTROWSKI.
AUTOMATIC SLUICE.
(Application filed Oct. 7, 1901.)
(No Model.) 8 Sheets—Sheet 5.

No. 700,096. Patented May 13, 1902.
W. B. SKOTNICKI & A. F. OSTROWSKI.
AUTOMATIC SLUICE.
(Application filed Oct. 7, 1901.)
(No Model.) 8 Sheets—Sheet 6.
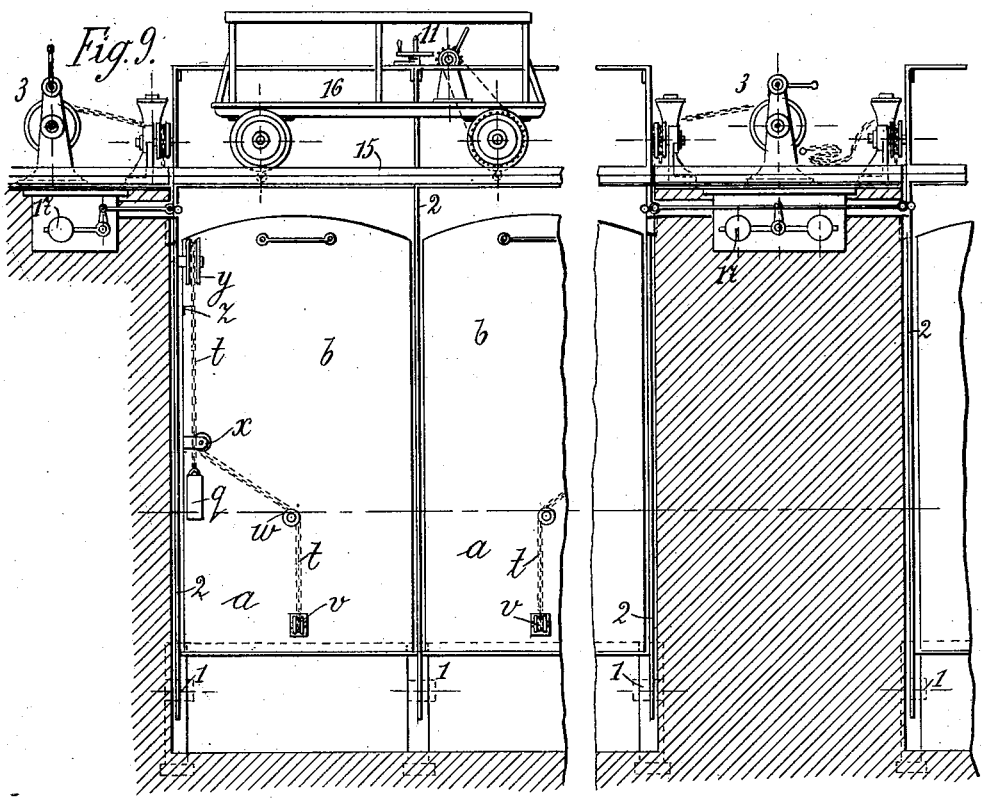
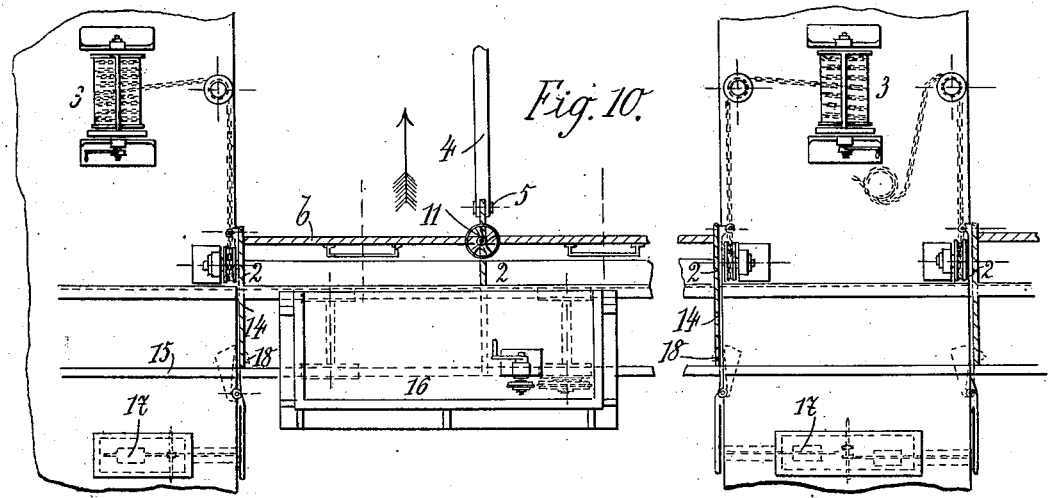
Witnesses
S. Brashears
M. C. Syddans
Inventors
W. B. Skotnicki
A. F. Ostrowski
by G. Dittman Atty No. 700,096. Patented May 13, 1902.
W. B. SKOTNICKI & A. F. OSTROWSKI.
AUTOMATIC SLUICE.
(Application filed Oct. 7, 1901.)
(No Model.) 8 Sheets—Sheet 7.
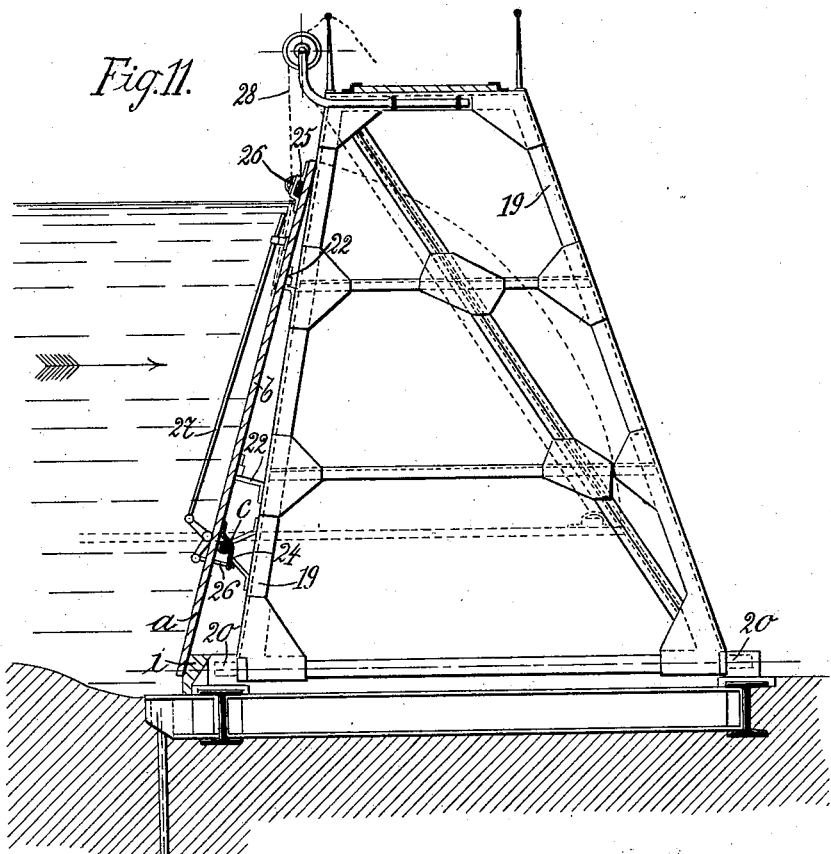
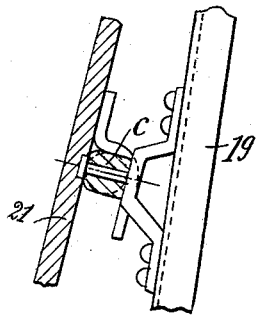
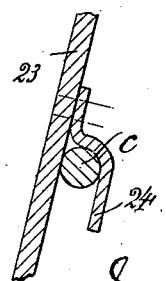
Witnesses
S. Brashears
M. C. Lyddane
Inventors
W. B. Skotnicki
A. F. Ostrowski
by G. Dittman Atty No. 700,096. Patented May 13, 1902.
W. B. SKOTNICKI & A. F. OSTROWSKI.
AUTOMATIC SLUICE.
(Application filed Oct. 7, 1901.)

(No Model.) 8 Sheets—Sheet 8.

Witnesses
G. Brashears
M. C. Syddans

Inventors
W. B. Skotnicki
A. F. Ostrowski
by G. Dittman
Attorney

UNITED STATES PATENT OFFICE.

WINCENTY BOGUMIL SKOTNICKI, OF WARSAW, AND ALEXANDER FELIX OSTROWSKI, OF KORCZEW, RUSSIA.

AUTOMATIC SLUICE.

SPECIFICATION forming part of Letters Patent No. 700,096, dated May 13, 1902.

Application filed October 7, 1901. Serial No. 77,856. (No model.)

*To all whom it may concern:*

Be it known that we, WINCENTY BOGUMIL SKOTNICKI, residing at Warsaw, and ALEXANDER FELIX OSTROWSKI, residing at Korczew, government Siedlce, Poland, Russia, have invented certain new and useful Improvements in Automatic Sluices called "Tekor-Autostat;" and we do hereby declare the following to be a full, clear, and exact description of the invention, such as will enable others skilled in the art to which it appertains to make and use the same.

The object of the present invention is the below-described construction of a perfectly self-acting sluice—viz., the sluice under normal conditions regulates the level of the water, while on a sudden or excessive rise of the water it opens completely, so as to allow the excess of water to flow off, and closes of itself as soon as the water has sunk below a required level.

Figure 8:
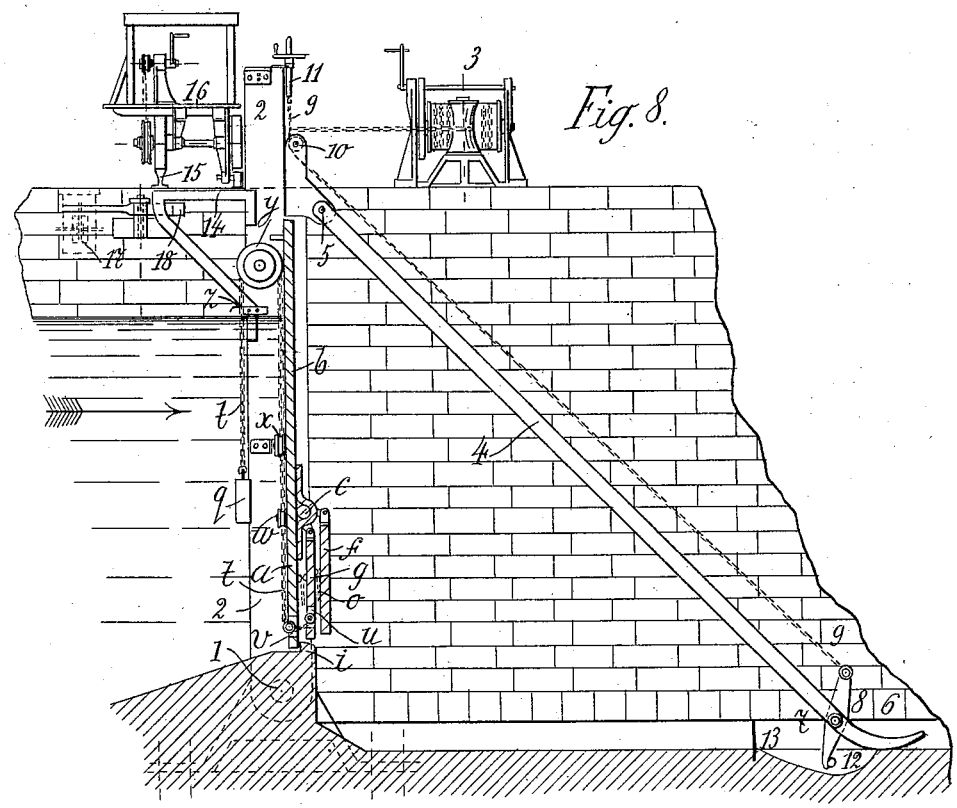
Figure 12:
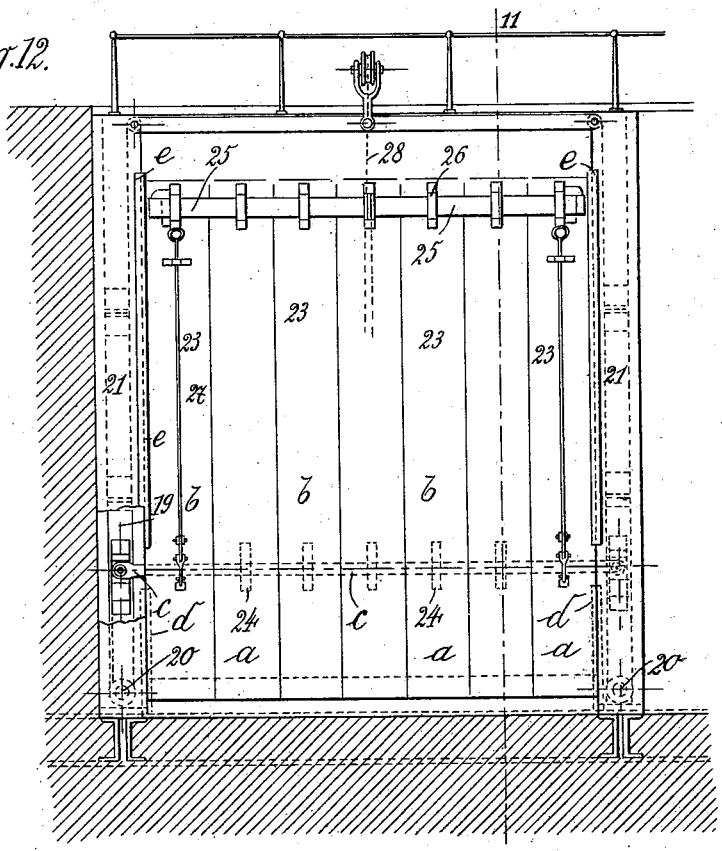

The annexed drawings represent, in Figure 1, a side view of the sluice under submission in a section in the line 1 1 of the Fig. 2; Fig. 2, a front view of the sluice-canal provided with the sluices under submission; Fig. 3, a detailed view of a variation in the form of construction of the leaves fixed to the shutter; Fig. 4, a side view of a section of the shutter provided with movable leaves; Fig. 5, one of the possible variations in the mode of fixing the movable leaves to the shutter; Figs. 6 and 7, a front view and vertical section of the shutter with a device for fixing the movable leaves; Figs. 8, 9, and 10, a side view in a section front view and plan of the weir with the sluice-gates laid open on hinges for the passage of vessels and rafts provided with the shutters under submission; Fig. 11, a side view in a section in the line 11 11 of the Fig. 12 of a like folding weir, Poire system, with the shutters under submission; Fig. 12, a front view of the above folding weir; Fig. 13, a detailed view of the mode of fixing the axletree in the frame of the weir; Fig. 14, a detailed view of the mode of suspending the boards of the shutter upon the axletree.

As shown by Figs. 1 and 2, shutter $a\ b$, of optional width, revolves in the opening of the sluice on a horizontal axle C, which can either be fixed on the surface of the shutter or lie in its plane. Abutments are provided—for the lower part $a$ abutments $d$ on the outer side of the opening (*i. e.*, on the side opposite to the pressure of water) for the upper part $b$ abutments $e$ on the side of the pressure of water (on the water side.) By the pressure of water the shutter is pressed against the abutments, and thus balanced; but on the rise of the water-level beyond a certain limit the momentum of hydrostatic pressure on the upper part of the shutter overcomes that on the lower part. The shutter is then unclosed to a certain angle and the excess of water allowed to flow off. In case the influx of water is comparatively mild there is time for the excess of water to flow off through the unclosed shutter without lowering same completely, whereupon the shutter returns to its original closed position, while on a sufficiently abundant or sudden influx the water draws off the shutter beyond the extreme angle, from which it can return to its original vertical position, and the shutter is then lowered to occupy the position shown in a broken line by Fig. 1, thus leaving free passage for the water. The shutter is lowered approximately at the moment the water comes to a stand in the upper part twice as high as in the lower. That the shutter on the fall of the water-level could reclose of itself, it is provided in its lower part with two leaves $f\ g$, placed successively on the outer side of the shutter in a position possibly radial to that of the ax $c$. The number of the leaves is of course optional; but practically there is no need to employ more than two. These leaves may be fixed to the shutter either immovably, as shown, for example, by the Fig. 1, or movably, as represented by Figs. 4 and 5. In the former case they are connected with the shutter and with each other by means of props $h$. It is preferable that the exterior leaf $f$ be made of such a length as to knock on the shutter being lowered, with its end against the sill $i$ of the sluice and the intermediate one $g$, so as to pass freely over the sill, as shown by Fig. 1. The leaves can be made solid completely or in suitable parts, as shown by Fig.

3, representing, by way of example, an exterior leaf composed of three shafts or stems $k$, covered in their lower part only by a board $l$.

The action of the leaves is so clear as to require no explanation. A shutter on being lowered is maintained in the position shown in a broken line by Fig. 1 until the water-level has sunk so much that the water can no longer overflow the lowered upper part of the shutter, but merely press against the leaves. The shutter then returns almost instantaneously to its normal vertical position. This return motion of the shutter ensues infallibly and is effected according to the aforesaid rapidly after the equilibrium has once been affected—that is, after the pressure of water against the leaves of the lower part of the shutter has overbalanced the gravitation of the water overflowing the upper part of the shutter. The leaves on shutters of normal size, as shown by repeated test constructions, play at all times satisfactorily without any auxiliary contrivances whatever. It is only for uncommonly weighty or from some other cause unmanageable shutters that the action of water upon the leaves would have to be increased by means of concave sills fitted to the floor of the sluice like one represented by Figs. 1 and 2, letter $m$, by providing side walls $n$ $n$ to limit the space in which the leaves play or finally by the appropriate increase of the weight of the lower part of the shutter. A suitable weight, fitted to the shutter and sliding adjustably up and down a vertical rod, can also serve, in general, to regulate the sensibility of the shutter, as desired, as well with respect to the angle of inclination produced according to the aforesaid by the fluctuation of the normal level of water as with respect to the initial moment of the coming into the play of the leaves in a shutter already lowered. The lower the suspension of the weight, the slighter the inclination of the shutter under normal conditions, the more difficult it is lowered and the sooner drawn up. Still more precise regulation of the shutter with respect to sensibility can be attained by horizontally moving the weight along the rod perpendicular to the plane of the shutter.

The leaves, according to the aforesaid, can also be fitted to the shutter movably. In such case, in the normal position of the shutter, they depend from same, lying close to it and over each other and open only on the shutter being lowered, when their traverse is restrained by means either of chains $o$ of definite length, fastening the intermediate leaf to the shutter and the exterior to the intermediate one, or by means of suitable props provided immediately on the shutter or formed by appropriate juts (catches) at the hinges or hooks on which the leaves turn. A possible form of such construction is represented by Fig. 5, where the juts $r$ referred to form one with the cramps $s$, by means of which the shutter is held on the ax $c$. These cramps can at the same time carry also hinges $p$ for the leaves, as shown by the drawings.

In case of a shutter provided with moveable leaves it may be found desirable to have it in one's power to prevent the leaves from unclosing on the shutter being lowered—for instance, in order to sink the water below the ax $c$. To attain this end, divers contrivances can be used in the shape of moving bolts, catches, chains, and like. One of the most proper arrangements of this kind is shown by Figs. 6 and 7 of the drawings. It consists in a chain $t$, fastened to the exterior leaf $f$ on its inner surface, then passed freely through opening $u$, with an antifrictional roll on the intermediate leaf $g$, and finally through opening $v$ in the shutter. Here the chain runs over circumference of a vertical pulley-block fitted in the opening or immediately over its ridge, from whence it is passed alongside the surface of the shutter up to the pulley-block on the level with the revoluble ax $c$, from thence up to the pulley-block $x$ on the side pillar of the sluice and up the pillar to the pulley-block $y$. To the end of the chain hanging loose from the pulley-block $y$ is attached small weight $q$, which balances the chain. If necessity occurs to fix the leaves, so that they do not open on the shutter being lowered, the chain is fastened to the hook $z$, driven into the side pillar of the sluice in the position shown by Figs. 6 and 7. It is obvious that on being placed thus the chain holds the leaves firm and does not in the least interfere with the motion of the shutter itself. The small openings in the leaves are of no consequence whatever for the action of the leaves.

The described self-acting sluice is applicable for sluices of various types and employ—single and multiple stowing sluices, canal-locks, stationary opening and folding weirs, and like. Two instances of such application are represented, by way of example, on further drawing-sheets, viz: Figs. 8, 9, and 10 show the shutter under submission as applicable to a weir, the sluice-pillars 2 of which are lowered, together with the sluices, on hinges 1 to give passage to vessels. For lowering the pillars serve windlasses 3, mounted on the side walls of the canal or on the piers of the weir. The pillars, as shown by the exemplary drawings of the construction, are kept erect by props 4, to which they are fixed by means of a hinge-joint 5 in such a manner that as the pillars are being lowered the tail ends 6 of the props glide over the floor of the sluice, and, finally, when the pillars come to lie upon the floor the props form with them one straight line. At the tail ends of the props for the intermediate pillars catches 7 are provided in the shape of small two-armed levers revolving on hinge-joints 8. From the upper end of each separate catch runs chain 9 to the upper part of pillar, where it passes over the pulley-block 10, the end being fixed to the stretching-screw 11, provided with a handle. The lower end of the catch on the pillar being erected knocks against the transversal stop 12, driven into a suitable cavity 13 made in the floor, whereupon by means of the stretching-screw referred to above the prop is strained up and fixed in the position. It is clear that prior to letting the pillars down the chain 9 must be, to a sufficient length, relaxed from the stretching-screw. With number 14 are marked brackets on the pillars to carry rails 15 for communication between the piers and with the shore, on which laborers' trolleys 16 are run in a universally-known manner. These rails in the normal position of the pillars coincide with rails on the piers, and on lowering the pillars they sink with them into water. The latches 18 on the piers, drawn off by the counterbalances 17, catch the brackets 14 on the pillars touching the piers, and thus maintain the pillars in vertical position. Prior to lowering the pillars these latches are drawn off by means, for instance, of iron bars inserted between them and the pier on the outside.

A weir of such construction, if fitted with the shutters under submission, provided with an appropriate contrivance to maintain the leaves, as shown, for instance, by Figs. 6 and 7, is folded with great ease and promptitude, viz: First, the leaves of the shutters are fixed firm by fastening the chains $t$ to the hooks $z$, then the chains 9 are relaxed for the intermediate pillars and the shutters $a$ $b$ lowered with boat-hooks, and, finally, the windlasses kept ready, latches 18 drawn off, and the whole frame of the sluice lowered upon the floor. To remount the weir, the frame is first heaved with the windlasses, with which motion of the frame the opened shutters do not interfere. Then the pillars of the frame are fixed erect by means of above-mentioned contrivances—i. e., side pillars with latches and intermediate pillars with the chains 9 on props—and chains $t$ detached from hooks $z$, whereupon the shutters are drawn up by themselves.

By way of example is represented one more adaptation of the shutters under submission to the well-known folding weir, Poire system. This weir is composed of a series of resisting-frames 19, which on opening the weir are brought down on the hinge-joint 20 to lie across the current of river. The shutters under submission are adaptable to them in such a manner that the ax $c$ for the shutters is connected with the frames on the water side movably, as shown by Figs. 12 and 13. The leaves are made in the shape of long narrow boards answering to the detachable single shutter-boards of the Poire system. The exterior boards 21 are fastened with hooks 22 direct to the frames. They are provided with abutments $e$ and $d$, Fig. 12. The subsequent inner boards 23 are suspended on the ax $c$ by means of hooks 24, Figs. 12 and 14, and are fastened all to form one shutter by the bar 25, passed through cramps 26 in the upper part of the boards. Besides, to prevent the shutter from slipping off the hooks by swimming up two (for instance, inner) boards are fixed by catches 26, which catch up the ax $c$ and are retractable by means of stretchers 27. The movable leaves in this instance can be arranged just as in the preceding one. On Figs. 11 and 12 these particulars are omitted to make the drawings more clear. The chain 28 serves to regulate when necessary the inclination of the shutter. Thus the automatic shutters under submission are applicable to weirs Poire. The horizontally-lowered shutters may with small weirs not interfere with the folding of the frame, and therefore there may be no necessity of removing them while folding the weir in known manner; but upon this matter it is superfluous to expatiate, the Poire system having nothing to do with the object of the patent applied for.

Accordingly the object of the patent solicited is—

1. In an automatic sluice, the combination with a suitable frame, of a transverse shaft therein located nearer the bottom than the top, a straight, normally upright shutter pivotally mounted on said shaft, the part below the shaft being shorter than the part above, a stop to prevent movement of the lower wing of the shutter from the perpendicular in the direction of the flow of the water, a stop to prevent movement of the upper wing in the direction opposite to the flow of the water, leaves attached at their upper ends outside of the lower wing, and means whereby said leaves are caused to follow the inward movement of the lower wing and at an acute angle thereto, substantially as described.

2. In an automatic sluice, the combination with a suitable frame, of a transverse shaft therein located nearer the bottom than the top, a straight, normally upright shutter pivotally mounted on said shaft, the part below the shaft being shorter than the part above, a stop to prevent movement of the lower wing of the shutter from the perpendicular in the direction of the flow of the water, a stop to prevent movement of the upper wing in the direction opposite to the flow of the water, leaves loosely pivoted at their upper ends outside of the lower wing and normally depending vertically when the wing is vertical, and means for limiting their distances from the lower wing, and from each other, when the wing is moved inward, substantially as described.

3. In an automatic sluice, the combination with a suitable frame, of a transverse shaft therein located nearer the bottom than the top, a straight, normally upright shutter pivotally mounted on said shaft, the part below the shaft being shorter than the part above, a stop to prevent movement of the lower wing of the shutter from the perpendicular in the direction of the flow of the water, a stop to prevent movement of the upper wing in the direction opposite to the flow of the water, leaves loosely pivoted at their upper ends outside of the lower wing and normally depending vertically when the wing is vertical, and means for holding the leaves closely against the rear face of the lower wing during any inward movement of said wing, substantially as described.

4. In an automatic sluice, the combination with a suitable frame, of a transverse shaft therein located nearer the bottom than the top, a straight, normally upright shutter pivotally mounted on said shaft, the part below the shaft being shorter than the part above, a stop to prevent movement of the lower wing of the shutter from the perpendicular in the direction of the flow of the water, a stop to prevent movement of the upper wing in the direction opposite to the flow of the water, leaves loosely pivoted at their upper ends outside of the lower wing and normally depending vertically when the wing is vertical, a pulley in an opening in the intermediate leaf, a pulley in an opening in the lower wing, a pulley on the inside of the shutter at the height of its shaft, a pulley on the pillar or side wall of the sluice, a chain secured to the inside of the outer leaf and passing about all of said pulleys, and a weight at the end of said chain, substantially as described.

5. In an automatic sluice, the combination with the shutter and the pillars therefor pivoted at their lower ends of a strut longer than the pillars and pivoted at its upper end to the upper ends of the pillars, said strut having its lower end shaped to move freely upon the bottom of the sluiceway, a transverse stop on said bottom, a two-armed lever pivotally attached to the strut near its lower end the lower arm of said lever being adapted to engage said stop when the shutter is raised, a chain attached to the upper arm of said lever, means for pulling said chain, and a screw-spindle connected to said chain to securely tighten it, substantially as described.

In testimony whereof we affix our signatures in presence of two witnesses.

WINCENTY BOGUMIL SKOTNICKI. [L. S.]
  ALEXANDER FELIX OSTROWSKI. [L. S.]

Witnesses:
 ALEXANDER MOROZEWICZ,
 ADAM MICKIEWICZ.